Nov. 24, 1942.     O. TAMAN     2,303,241
BICYCLE LOCK
Filed July 31, 1941     2 Sheets-Sheet 2
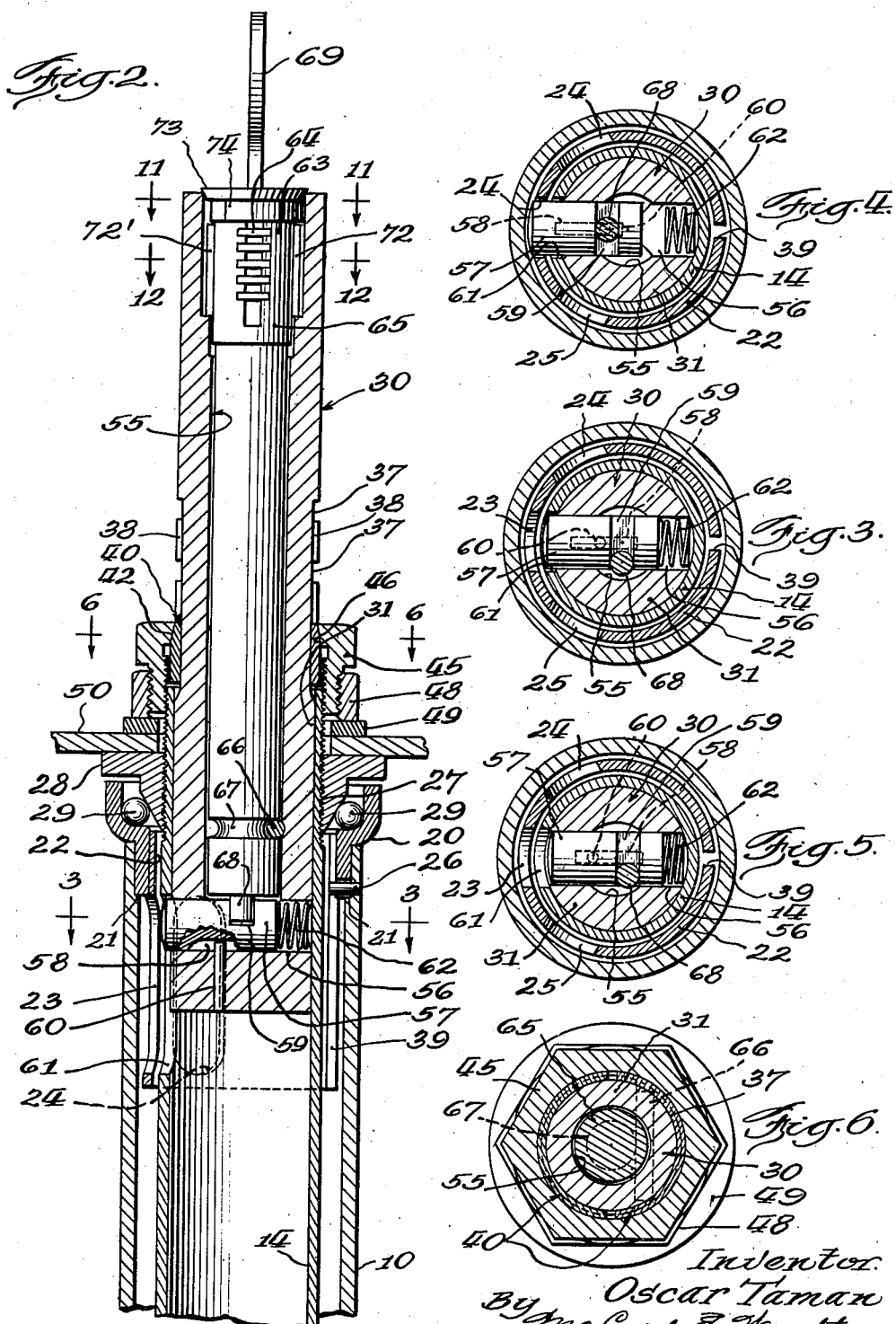
Inventor:
Oscar Taman Patented Nov. 24, 1942

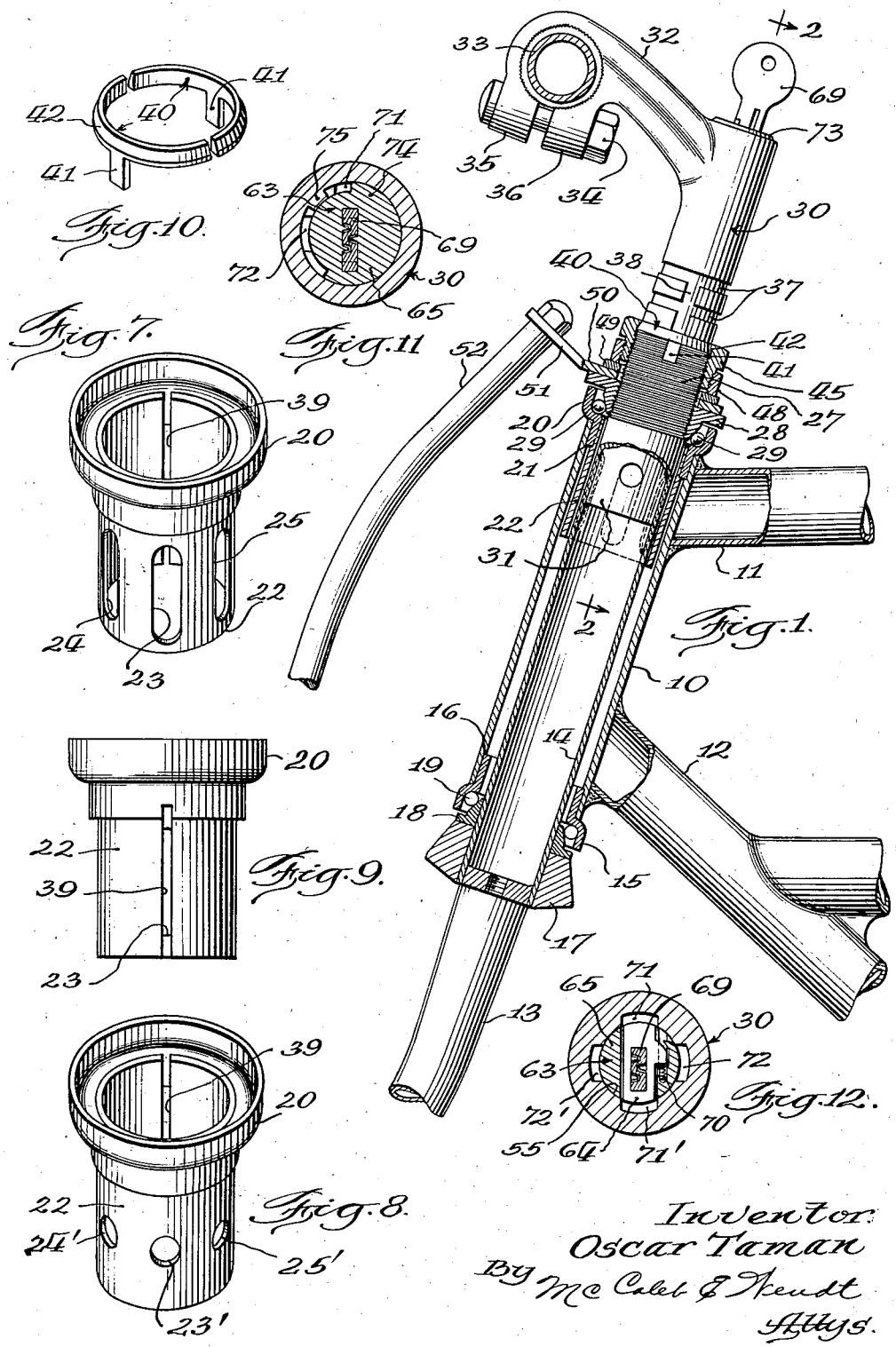

2,303,241

UNITED STATES PATENT OFFICE 2,303,241

BICYCLE LOCK

Oscar Taman, Chicago, Ill., assignor of one-fourth to Frank W. Schwinn, Chicago, Ill.

Application July 31, 1941, Serial No. 404,817

13 Claims. (Cl. 70—233)

My invention relates to bicycle locks, and especially to bicycle locks installed in steering posts and utilizing a cylinder lock in the gooseneck or bar stem.

One of the objects of my invention is to provide a bicycle lock which will allow locking of the vehicle steering post in one of a number of positions.

Another object of my invention is to provide a bicycle lock in which the locking means are firmly retained within the tubular steering head of the bicycle while it is unlocked, thereby preventing theft of the lock as an accessory. Also, in event of theft of the unlocked bicycle the thief cannot readily substitute a different lock in order to avoid identification of the bicycle.

Another object of my invention is to provide a bicycle lock in which removal of the locking mechanism can be achieved only by turning the key of the lock beyond the unlocked position.

Another object of my invention concerns a steering post which is adjustable in height, and the adaption of a steering post lock despite the complication of the height adjustment.

Further objects, features and advantages of my invention will become apparent upon study of the following specification, taken in conjunction with the accompanying drawings, in which:

Fig. 1 is an elevation partly in section through the head of a bicycle frame fitted with the lock of my invention;

Fig. 2 is an enlarged longitudinal section taken along the line 2—2 of Fig. 1;

Fig. 3 is a plan cross-section taken along the line 3—3 of Fig. 2;

Figs. 4 and 5 are cross-sections similar to Fig. 3, but showing the locking mechanism in different positions;

Fig. 6 is a plan cross-section taken along the line 6—6 of Fig. 2;

Fig. 7 is a perspective view of the slotted bearing race employed in my lock;

Fig. 8 is a perspective view of a modified form of bearing race;

Fig. 9 is an elevation of the slotted rear side of the bearing race of Fig. 7;

Fig. 10 is a perspective view of the split retaining ring employed in my lock;

Fig. 11 is a plan cross-section taken along the line 11—11 of Fig. 2; and

Fig. 12 is a plan cross-section taken along the line 12—12 of Fig. 2.

I have illustrated my invention incorporated in a bicycle of standard construction, including a steering head 10 welded to the ends of a tubular horizontal bar 11 and a reach bar 12. The steering fork 13 terminates in a tubular shank or extension 14, which is journaled within the steering head 10 by means of two sets of ball bearings located respectively at the upper and lower ends of the head (Fig. 1).

The lower bearing comprises a flanged or cupped raceway 15 driven into the lower end of the steering head 10 and abutting an internal shoulder 16. The crown 17 of the fork is secured to the lower end of the steering fork extension 14 as by welding and supports a conical race 18 having a snug fit around the steering fork extension 14. The balls 19 roll between the raceway 15 and the conical race 18.

The upper steering head bearing consists of a similar cupped raceway 20 driven into the upper end of the steering head and against an internal shoulder 21. The raceway 20 is welded around a split cylindrical retaining member 22 (Figs. 7 and 9) provided with three vertical slots 23, 24 and 25. The cylindrical retaining member 22 depends downwardly into the steering head 10 and surrounds the steering fork extension 14, which is free to rotate therein. The retaining cylinder 22 is correctly oriented within the steering head 10 during assembly by a small pin 26 (Fig. 2) driven through the wall of the steering head 10 and engaging the narrow slot 39 between the edges of the split retaining member 22. The upper end of the steering fork extension 14 is provided with a set of threads 27 over which is screwed the threaded conical flanged race 28, which rides upon a plurality of steel balls 29 guided within the raceway 20. Looseness in the steering head bearings can be taken up by tightening the race 28 upon the threads 27 of the steering fork extension 14.

The lower portion 31 of the steering post 30 has a loose turning fit within the upper portion of the steering fork extension 14. At its upper end, the steering post 30 terminates in a gooseneck 32 through which passes the handle bar 33. The latter is adjustably secured by tightening a stud bolt 34, which draws together the lugs 35 and 36 extending from the split end of the gooseneck.

The steering post 30 is provided with a number of annular horizontal grooves 37 connected at opposite sides of the post by a pair of similarly shaped vertical grooves 38. These grooves are adapted to receive the two halves of a split ring 40 provided with downwardly depending lugs 41 (Fig. 10). The split ring may be fitted into any one of the annular groves 37 and is then turned until the lugs 41 are retained by the aforesaid vertical grooves 38. The cap 45 first is screwed into a narrow sleeve 48 and then the internally and externally threaded ferrule or cap 45 is dropped over the split ring 40 and is screwed down on the threaded upper end of the fork extension 14. The chamfered outer edge 42 of the ring is engaged firmly by the beveled inner edge 46 of the cap 45 securely to hold the split ring in the selected grooves, and to clamp the steering post to the extension 14. The lower edge of the sleeve 48 bears down upon a washer 49 placed over the bifurcated plate 50, to the arms 51 of which are fastened the front fork braces 52, to clamp the plate 50 to the top of the bearing cone 28.

When the structure described above is assembled and tightened up, free relative rotation is possible between the steering fork extension 14, including its associated parts, and the cylindrical retaining member 22.

The steering post 30 is provided with a central longitudinal bore 55 extending from the upper extremity of the post down to an intersecting cross bore 56 which may be of somewhat smaller diameter. The cross bore 56 is fitted with a lock bolt 57 provided with a longitudinal guiding slot 58 on its under side and a traverse slot 59 on its upper side. A pin 60, extending upwardly from the bottom of the steering post 30 into the slot 58, prevents rotation of the bolt 57 within the cross bore 56. When in the left-most or locking position (Fig. 4) the bolt 57 extends out through a vertical slot 61 in the wall of the steering fork extension 14 and into one of the slots 23, 24, 25 of the retaining member 22. The sides of the slots act as abutment shoulders to prevent horizontal swinging movement of the bolt when within the slots.

When the bolt 57 engages the middle slot 23, the bicycle handle bars are locked against turning, with the front wheel straight forward.

When the bolt 57 engages slots 24 or 25, the bicycle is locked with the front wheel turned to the right or to the left, respectively.

When the bolt 57 is out of engagement with the slotted cylindrical retaining member 22, but yet is within the slot 61 of the steering fork extension 14 as illustrated in Fig. 3, the handle bars are unlocked and the bicycle may be steered in the normal manner. But when the bolt is in that position, the lock mechanism cannot be removed by unscrewing the cap 45, because the steering post 30 cannot be withdrawn as long as the bolt 57 is in slot 61 of the fork extension 14.

When the bolt 57 is entirely retracted into the cross bore 56, the steering post 30 may be withdrawn up from the end of the steering fork extension 14 after unscrewing the cap 45. This is done to adjust the height of the steering post by placing the split ring 40 in one of the several grooves 37, to substitute a different lock for the one previously employed, or to disassemble the steering mechanism. Adjustment of the height of the steering post is accommodated by the length of the slots 23, 24, 25 and 61, which allow considerable vertical adjusting movement of the post while preventing relative rotation between the slotted parts when engaged by the bolt 57.

A spring 62 is mounted in the cross bore 56 and has a normal fully extended length to contact the end of the bolt without compression when the bolt is in the intermediate position of Fig. 3.

A cylinder lock 63 is mounted in the steering post 30. As here shown it is the type of cylinder lock where the tumblers 64 are carried in the plug 65. The plug 65 is elongated to extend throughout most of the height of the steering post and is journaled in its bore 55. A cross pin 66, passing chordwise through the steering post and tangentially of an annular groove 67 in the lock plug 65, precludes relative vertical movement of the plug 65 and the steering post, while permitting their relative rotation. An eccentric stud 68 protrudes from the lower end of the plug 65 and engages the transverse groove 59 in the upper side of the bolt 57. By means of the eccentric stud 68 the angular position of the plug 65 controls the transverse position of the bolt 57 in the cross bore 56 of the steering post.

As shown in Fig. 12, each flat tumbler 64, through which the key 69 passes, is urged in one direction diametrically of the plug by an associated spring 70. When not shifted by the profile of the key to a position within the diameter of the plug 65, the flat tumblers 64 are urged by their springs 70 into a vertical groove 71 in the bore 55 of the steering post. A vertical groove 71' is provided diametrically opposite the groove 71 into which the back ends of the tumblers may be extended as they are reciprocated by the profile of the key in inserting and removing the key. Another set of diametrically opposed vertical grooves 72 and 72' is provided ninety degrees from the grooves 71 and 71'.

Figs. 2, 3, 11 and 12 show the locking mechanism in the normal riding position, except that the key would ordinarily be withdrawn. When the key is withdrawn, the tumblers 64 would be shifted into the grooves 71. As shown in Figs. 2 and 3, this would permit the steering post and the fork extension 14 to rotate as a unit within the steering head and the retaining member 22, the bolt 57 being withdrawn from the slots of the retaining member.

To lock the bicycle, the front wheel is held in a position parallel with the frame, the key 69 is inserted in the lock to withdraw the tumbler 64 into the diameter of the plug 65 and the key is turned ninety degrees to the right (clockwise in the plan section), and then the key is withdrawn, whereupon the tumblers 64 are shifted by their springs 70 into the vertical grooves 72. Because this operation rotates the plug 65 and its stud 68 clockwise ninety degrees, the bolt 57 is shifted leftward from the position of Figs. 2 and 3 to the position of Fig. 4, where the end of the bolt enters the slot 23 in the retaining member 22. The retaining member 22 being fixed to the steering head by the pin 26, the fork extension 14 and the steering post cannot then be turned, and hence the bicycle cannot be steered.

Optionally, this locking may be done while the front wheel is turned some sixty degrees to the right, in which case the bolt 57 will enter the slot 24 and lock the steering fork in a turned position rather than in a straight ahead position. Or, the front wheel may be turned some sixty degrees to the left, in which case the bolt will enter the slot 25 and lock the fork in that position. Locking the fork and front wheel in a turned position rather than in a straight ahead position has the advantage that it makes it more difficult for a thief to wheel the bicycle, because it tends to confine movement to a small circle, forcing him at least partially to carry the bicycle in order to move it a distance.

To unlock the bicycle, the key is inserted in the lock, the lock turned back ninety degrees counterclockwise, and the key again withdrawn, which leaves the steering post free to rotate.

In either the locked or unlocked positions, that is, the positions of Figs. 3 and 4, respectively, it is impossible to remove the lock mechanism or to withdraw the steering post from the fork extension. To make it possible to assemble my lock in the bicycle and also to permit disassembly for repair or replacement, I make provision for the withdrawal of the bolt 57 entirely into the bore 56 thus clearing it relative to the wall of the fork extension 14. It is clear from Fig. 2 that unless the bolt 57 is withdrawn from the slot 61 in the fork extension, it will preclude withdrawing the steering post from the fork extension. The fully retracted position of the bolt 57 is shown in Fig. 5. It is accomplished by turning the plug 65 counterclockwise a few degrees from the normal position of Fig. 3. This is done by inserting the key and turning the key about forty-five degrees counterclockwise from the position of Fig. 12. The key cannot be withdrawn while the plug is in the position of Fig. 5, because there would be no slots such as 71 and 72 to receive the shifted tumblers 64.

The function of the spring 62 in the cross bore 56 is to resist back turning of the plug 65 from the position of Fig. 3 to the position of Fig. 5. The normal length of the spring 62, as shown by Figs. 3 and 4, is such that the end of the bolt does not start to compress the spring until the plug is back turned from the position of Fig. 3 toward the position of Fig. 5. The spring 62 thus tends to hold the plug in the normal position of Fig. 3 in unlocking the bicycle, and any back turning to the position of Fig. 5 is against the conscious and substantial resistance of the spring.

Immediately beneath its head 73 at its upper end, the plug 65 carries a semi-annular flange 74, the ends of which form abutments co-operating with the radial faces or shoulders on a lug 75, carried on the inside of the post 30 at its upper end, as shown in Fig. 11. This limits the rotation of the plug between the position of Fig. 4 and the position of Fig. 5.

It is not necessary to back turn the plug 65 to the position of Fig. 5 in order to adjust the height of the steering post 30. This may be done without manipulating the lock. It is merely necessary to unscrew the cap 45 and reseat the split ring 40 in the desired groove 37. The length of the slot 61 permits of this vertical adjustment without the necessity of withdrawing the bolt therefrom.

If the feature of adjustability of the height of the steering post is not to be included in the bicycle, then the slot 61 may be reduced to a round hole and the slots 23, 24 and 25 in the retaining member may be reduced to round holes 23', 24' and 25', respectively, as shown in the modification of Fig. 8. Adjustability of the height of the steering post is usually desirable and I have provided a solution for the problem of doing so, despite the inclusion of the lock in the steering post.

While relative rotation of the steering post and the fork extension 14 is precluded by the bolt in normal riding, wear between the slot in the extension 14 and the bolt, which might develop lost motion, is in practice precluded by the clamping action by the cap 45 on the split ring 40, which firmly frictionally holds the extension 14 and the steering post against relative rotation.

While I have illustrated and described these specific embodiments of my invention, I contemplate that many changes and substitutions may be made without departing from the scope or spirit of my invention.

I claim:

1. In a steering locked bicycle, a steering head, a tubular fork extension passing upwardly into, and journaled within, the head, a handle-barred steering post telescoped down into the extension, a cross bore in the post, a lock bolt slidable in the cross bore, an opening in the wall of the extension through which the bolt projects, a retaining sleeve nonrotatably fixed to the head and radially interposed between the head and extension, an opening in the sleeve for receiving the bolt, when shifted outwardly, to lock the post and extension nonrotatably to the head, and key-controlled lock means for shifting the bolt into and out of its opening in the sleeve.

2. A steering locked bicycle, according to claim 1, wherein a ball bearing is interposed, at the upper end of the steering head, between the steering head and fork extension, and the outer race thereof is tubularly flanged and fitted into the upper end of the head and the sleeve is carried by the tubular flange whereby to mount the sleeve in the head.

3. A steering locked bicycle, according to claim 1, wherein the key-controlled lock means may be back turned from normal riding position to withdraw the bolt from the opening in the tubular fork extension to permit the removal of the post from the fork extension.

4. A steering locked bicycle, according to claim 1, which includes means for clamping the post in the fork extension at a plurality of vertically adjusted positions and wherein the bolt openings in the fork extension and in the sleeve are vertically elongated to accommodate the different vertically adjusted positions of the post relative to the fork extension.

5. A steering locked bicycle, according to claim 1, wherein the mentioned bolt opening in the sleeve is so arcuately positioned that when the bolt is shifted into it the steering fork is locked in substantially straight ahead position, and wherein there is a second bolt opening in the sleeve arcuately spaced from the first-mentioned bolt opening therein, into which the bolt may optionally be shifted for locking the fork in a turned position.

6. A steering locked bicycle, according to claim 1, wherein the key-controlled lock means comprises a plug journaled within and extending longitudinally of the post, key-controlled tumblers carried by the plug at its upper end co-operating with vertical tumbler grooves in the upper end of the post, and an eccentric stud at the lower end of the plug engaging a cross slot on the upper side of the bolt whereby key-controlled rotation of the plug shifts the lock bolt.

7. A steering locked bicycle, according to claim 1, wherein the key-controlled lock means comprises a plug journaled within and extending longitudinally of the post, key-controlled tumblers carried by the plug at its upper end cooperating with a plurality of vertical tumbler grooves arcuately spaced in the order of ninety degrees in the upper end of the post, and an eccentric stud at the lower end of the plug engaging a cross slot on the upper side of the bolt whereby key-controlled rotation of the plug shifts the lock bolt between, and locks it in, the two groove positions, in one of which positions the lock bolt passes through its opening in the fork extension but clears the sleeve and in the other of which positions the lock bolt also enters its opening in the sleeve, the parts being constructed and arranged to permit the plug, under control of the key, to be back turned from its first position to withdraw the bolt from its opening in the fork extension.

8. A steering locked bicycle, according to claim 1, wherein the key-controlled lock means comprises a plug journaled within and extending longitudinally of the post, key-controlled tumblers carried by the plug at its upper end co-operating with a plurality of vertical tumbler grooves arcuately spaced in the order of ninety degrees in the upper end of the post, and an eccentric stud at the lower end of the plug engaging a cross slot on the upper side of the bolt whereby key-controlled rotation of the plug shifts the lock bolt between, and locks it in, the two groove positions, in one of which positions the lock bolt passes through its opening in the fork extension but clears the sleeve and in the other of which positions the lock bolt also enters its opening in the sleeve, the parts being constructed and arranged to permit the plug, under control of the key, to be back turned from its first position to withdraw the bolt from its opening in the fork extension, and a compression spring disposed at the back end of the bolt and assuming compression by the bolt when the bolt is back shifted from the first position to the last-mentioned position to resist a back turning of the plug beyond the first-mentioned position.

9. In a steering locked bicycle, a ball bearing race cup adapted to fit into one end of the steering head, a sleeve carried at the inner end of the cup and adapted to lie within the steering head and surround the stem of the steering fork journaled by the bearing, means for non-rotatably fixing the sleeve to the head, and a lock bolt opening through the sleeve.

10. In a steering locked bicycle, a steering head stationary to the bicycle frame, said steering head having a vertical locking shoulder, a fork extension rotatable within the steering head and having an opening inwardly of the shoulder, a steering post insertable in the fork extension, a locking bolt mounted within the steering post and projectible to an intermediate interlocking position into the opening in the fork extension and further to a position beside said shoulder to prevent steering operation of the fork extension, and key controlled bolt operating means operable to move the bolt selectively from within the steering post to either of said projected positions and back again.

11. A bicycle steering mechanism comprising a steering head, a tubular front fork element extending up through and journaled in the steering head, a handle barred steering post telescoped down into the fork extension and having a horizontal groove in the periphery of the post, said post having a vertical groove connecting with the horizontal peripheral groove, a split ring of larger outside diameter than the post below the groove seated in the groove, a vertically extending lug carried by the ring and seated in the vertical groove, and a clamping ring threaded on the upper end of the fork extension and downwardly engaging the split ring for clamping the post to the fork extension at a relative height determined by the split ring in the groove.

12. A bicycle steering mechanism comprising a steering head, a tubular fork extension carried by the front wheel fork and extending up through and journaled in the steering head, a handle-barred steering post telescoped down into the fork extension, the post having a set of vertically spaced horizontal grooves in its periphery and having vertical grooves in its periphery which extend vertically from the horizontal grooves, a split ring seated in one of the grooves, a vertically extending lug on the split ring seated in a vertical groove associated with the horizontal groove in which the ring is seated for preventing rotation of the split ring upon the post, and a clamping ring threaded on the upper end of the fork extension above the steering head and downwardly engaging the split ring for clamping the post to the fork extension at a relative height determined by the selected groove in which the split ring is seated.

13. In combination in a steering locked bicycle, a steering head stationary to the bicycle frame, a fork extension journaled in said head, a steering post removably received within the fork extension and detachably secured thereto, the head being provided with a fixed abutment shoulder, interlocking means movable transversely relative to the axis of the steering post cooperative with a lower portion of the post and having a plurality of operative positions in one of which it interlocks the steering post and the fork extension against unauthorized separation, in another of which it interlocks the steering head abutment shoulder with the fork extension and the steering post to hold the fork extension and the head against relative rotation and thus prevent steering of the bicycle, and in a third of which it is out of interlocking relation with both said steering head abutment shoulder and said fork extension to enable withdrawal of the steering post from the fork extension, and a lock-controlled device mounted in the steering post for selectively moving the interlocking means between its said positions.

OSCAR TAMAN.